United States Patent [19]

Bodin et al.

[11] Patent Number: 5,353,200
[45] Date of Patent: Oct. 4, 1994

[54] PROCESS TRANSMITTER WITH INNER CONDUCTIVE COVER FOR EMI SHIELDING

[75] Inventors: Joel J. Bodin, New Hope; Garrie D. Huisenga, Plymouth; Theodore L. Johnson, St. Louis; William C. Rauth, Bloomington, all of Minn.

[73] Assignee: Rosemount Inc., Eden Prairie, Minn.

[21] Appl. No.: 21,802

[22] Filed: Feb. 24, 1993

[51] Int. Cl.⁵ ............................................ H05K 9/00
[52] U.S. Cl. .................... 361/816; 174/35 R
[58] Field of Search .......... 174/35 R, 35 GC, 35 MS, 174/51; 361/631, 632, 643, 652, 816, 817, 818; 334/85; 439/607, 608, 609, 610

[56] References Cited

U.S. PATENT DOCUMENTS

| | | | |
|---|---|---|---|
| D. 317,266 | 6/1991 | Broden et al. | D10/46 |
| D. 318,432 | 7/1991 | Broden et al. | D10/46 |
| 2,118,268 | 5/1938 | Schellenger | 201/48 |
| 2,958,750 | 11/1960 | Lebens | 174/35 GC |
| 3,542,988 | 11/1970 | Baldasare | 200/168 |
| 3,909,726 | 9/1975 | Dobrovolny et al. | 174/35 R |
| 4,313,025 | 1/1982 | Grube, Jr. | 174/50 |
| 4,384,165 | 5/1983 | Loving, Jr. et al. | 174/35 GC |
| 4,424,404 | 1/1984 | Moore et al. | 174/52 |
| 4,430,520 | 2/1984 | Tibbetts et al. | 174/35 R |
| 4,567,317 | 1/1986 | Ehrlich et al. | 174/35 R |
| 4,596,670 | 6/1986 | Liu | 252/511 |
| 4,749,821 | 7/1988 | Limton et al. | 174/35 R |
| 4,814,566 | 3/1989 | Sigl | 200/305 |
| 4,870,863 | 10/1989 | Duncan et al. | 73/431 |
| 4,878,012 | 10/1989 | Schulte et al. | 324/60 |
| 4,910,090 | 3/1990 | Kuhlman et al. | 428/469 |
| 4,936,690 | 6/1990 | Goetzinger | 374/181 |
| 4,958,938 | 9/1990 | Schwartz et al. | 374/208 |
| 5,001,298 | 3/1991 | Jong | 174/35 R |
| 5,070,216 | 12/1991 | Thornton | 174/35 GC |
| 5,128,835 | 7/1992 | Rudy, Jr. et al. | 361/816 |

FOREIGN PATENT DOCUMENTS 2169925A 1/1986 United Kingdom .

OTHER PUBLICATIONS

Brochure by Rosemount, Inc., "Model 3044C Temperature Transmitter", Aug. 1990.
Nine color photographs (numbered 1–9) showing views of various parts from the Rosemount Model 3004C temperature transmitter. The part shown by itself in photo 8 comprises a plastic part (black) with a conductive coating (grey) (no date provided).
Advertisement by Rosemount Inc. "Asking the Right Questions Leads to Smart Decesions", Jul. 1991.
Article, "Model 1151 Smart Pressure Transmitter keeps getting better", published in Oct. 1991, from Instrumentation & Control Systems, vol. 64, p. 145.
Two color photographs (numbered 1 and 2) showing views of a plastic cover and adhesive overlay used in the 1151 Smart Pressure Transmitter (no date provided. Rosemount, "Model 1151 Smart Pressure Transmitters," Dec. 1991.
Rosemount Inc., "Model 1151 Smart Pressure Transmitters," Oct. 1990.

(List continued on next page.)

Primary Examiner—Leo P. Picard
Assistant Examiner—Bot Ledynh
Attorney, Agent, or Firm—Westman, Champlin & Kelly

[57] ABSTRACT

A transmitter comprises a housing, an electronics assembly, an inner cover, and an outer cover. The electronics assembly includes an actuatable switch and fits within an open-ended cavity in the housing. The inner cover is positionable over the open end to cover the electronics assembly and has a deflectable button portion which is alignable with the actuatable switch and accessable from the open end while the electronics assembly is energized. The inner cover is electrically conductive and has a sleeve which frictionally mates with electrically conductive walls of the housing to shield the electronics assembly from electromagnetic interference (EMI). The inner cover is preferably an insulating molded plastic part with a thin metallic coating.

9 Claims, 7 Drawing Sheets

OTHER PUBLICATIONS

Two color photographs (number 1 and 2B) showing views of a plastic cover and adhesive overlay such as shown on p. "11-10" of item BB.

Rosemount Inc., "Maximum Flexibility At Minimum Cost," 1983 (date without month provided).

Manual 4592, "Model 2024 Differential Pressure Transmitter," Instruction Manual Jun., 1990.

Rosemount Inc. "Model 3044 Temperature Transmitter," Manual 4562, Aug. 1988.

Rosemount Inc., "Model 3051C Smart Pressure Transmitter," Manual 4622/4623, Jan. 1991.

Five color photographs (numbered 1–5) of a transmitter sold by Camille Bauer (no date provided).

PROCESS TRANSMITTER WITH INNER CONDUCTIVE COVER FOR EMI SHIELDING

BACKGROUND OF THE INVENTION

The present invention relates to process transmitters, such as transmitters which provide an analog or digital output over a pair of wires as a function of a measured absolute or differential pressure. In particular, the invention relates to transmitters to be used in environments of high electromagnetic interference (EMI) and which have circuitry which includes an actuatable switch for modifying a parameter of the circuit such as a zero or span setting.

Transmitters having circuitry disposed in a housing and protected by an outer cover are known. It is also known to include one or more actuatable switch for adjusting a parameter of the circuit, the actuatable switch being accessable only after removal of the outer cover. The present invention includes an electrically conductive inner cover having a sleeve in frictional contact with electrically conductive walls of the housing to reduce effects of EMI when the outer cover is removed, and simultaneously to permit operator access to the actuatable switch while the circuit is energized. EMI can result from electromagnetic waves broadcast from, for example, a radio communicator used by the operator.

BRIEF SUMMARY OF THE INVENTION

In the present invention, a transmitter comprises a housing, an electronics assembly, an inner cover, and an outer cover. The electronics assembly includes an actuatable switch and fits within an open-ended cavity in the housing, while the inner cover is positionable over the open end to cover the electronics assembly and has a deflectable button portion which is alignable with the actuatable switch and accessable from the open end while the electronics assembly is energized. According to the invention, the inner cover is electrically conductive and has a sleeve which frictionally mates with electrically conductive walls of the housing to shield the electronics assembly from EMI. The outer cover screws onto the housing over the inner cover. The inner cover is preferably composed of insulating plastic with a thin metallic coating.

DETAILED DESCRIPTION OF THE PREFERRED EMBODIMENTS

Figure 1:
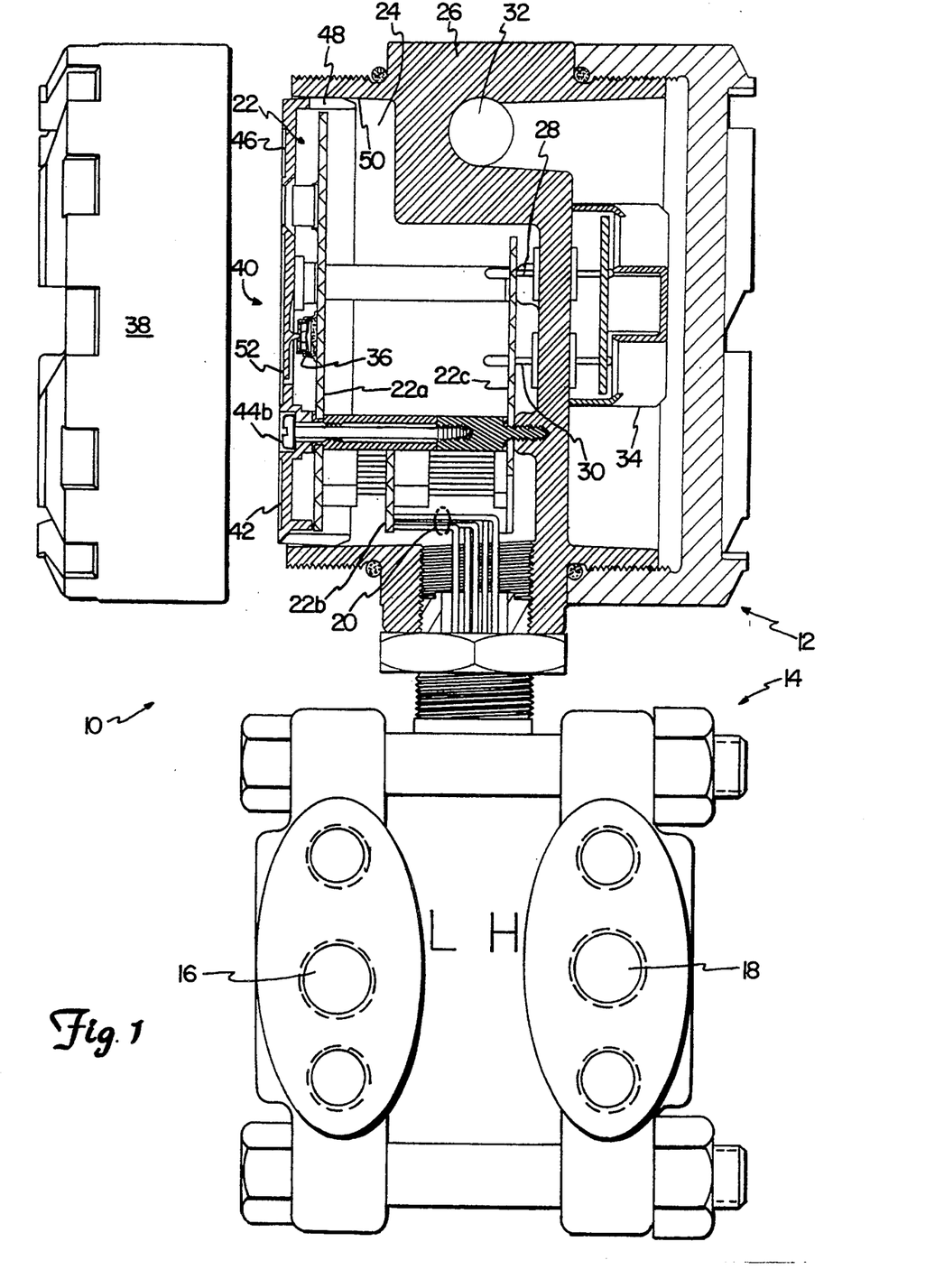
FIG. 1 is a partially sectional side view of a transmitter in accordance with the present invention.

Transmitter 10 in FIG. 1 includes a head unit 12 and a base 14. Process fluid communicates with inlets 16 and 18 in base 14, and a transducer (not shown) senses a differential pressure between the inlets and provides a transducer output on lines 20 as a function thereof. Circuit assembly 22, disposed at least partially in an open-ended cavity 24 of housing 26, receives the transducer output and provides a circuit output as a function thereof, and hence also as a function of the process fluid differential pressure. Feedthrough conductors 28,30 communicate the circuit output to a control unit (not shown) external to transmitter 10 via a pair of wires (not shown) which enter housing 26 through a port 32 and which connect to conductors 28,30 through terminal block 34. The control unit also includes a power supply connected to the wire pair which energizes circuit assembly 22 via the feedthrough conductors 28,30.

Circuit assembly 22 includes an actuatable switch 36 for local adjustment of the circuit output. Activation of switch 36 can, for example, reprogram circuit assembly 22 to provide a "zero" or a "span" level circuit output for the measurement condition existing at the time of switch activation.

An outer cover 38 removeably screws onto housing 26 over open end 40 of cavity 24. When in place, outer cover 38 protects circuit assembly 22 from debris external to transmitter 10 and also prevents access to actuatable switch 36. Preferably outer cover 38 and housing 26 are composed of metal such as aluminum or stainless steel, and in that case the placement of outer cover 38 on housing 26 also provides effective shielding of electronics assembly 22 from EMI in the vicinity of transmitter 10. Outer cover 38 can be safely removed while circuit assembly 22 is energized if an explosive atmosphere is not present at transmitter 10.

Figure 3:
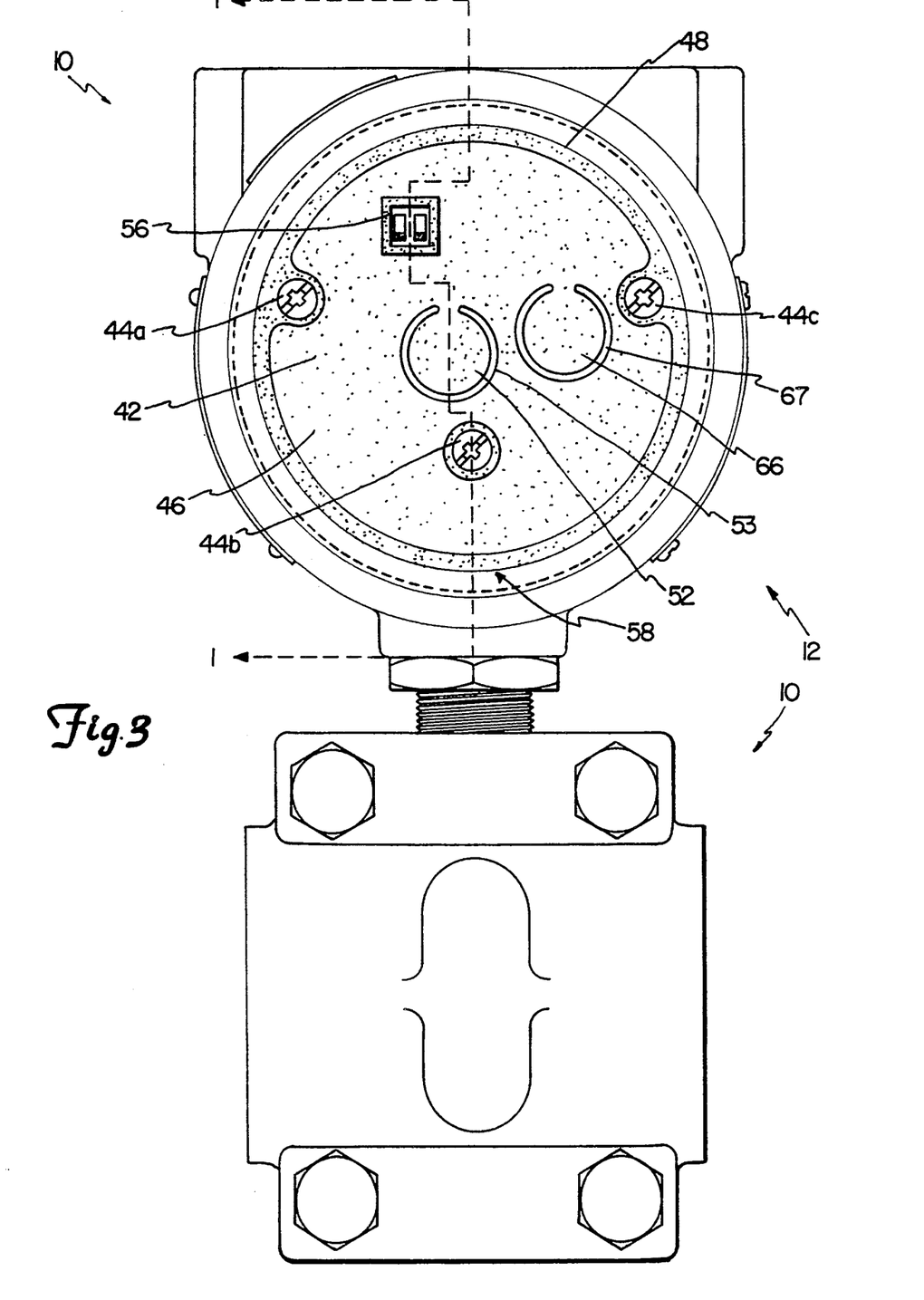
FIG. 3 is a front elevational view of the transmitter of FIG. 1, showing line 1—1 along which the sectional portion of FIG. 1 is taken.

An inner cover 42 is positionable over open end 40 of cavity 24 and is held to housing 26 by screws 44a, 44b, 44c (see also FIG. 3). Inner cover 42 includes a plate 46 and a sleeve 48 projecting from and surrounding the plate. According to the invention, inner cover 42 is electrically conductive and sleeve 48 is shaped to frictionally mate with electrically conductive walls 50 of housing 26. Alignable with actuatable switch 36 is a deflectable button portion 52 of plate 46. Inner cover 42 in frictional contact with conductive walls 50 effectively shields circuit assembly 22 from EMI when outer cover 38 is absent. Inner cover 42 in combination with electrically conductive walls 50 form a Faraday cage. Therefore, an operator who wishes to activate actuatable switch 36 can remove outer cover 38 in the presence of environmental EMI and, while circuit assembly 22 is energized, press deflectable button portion 52 to activate switch 36.

Figure 2:
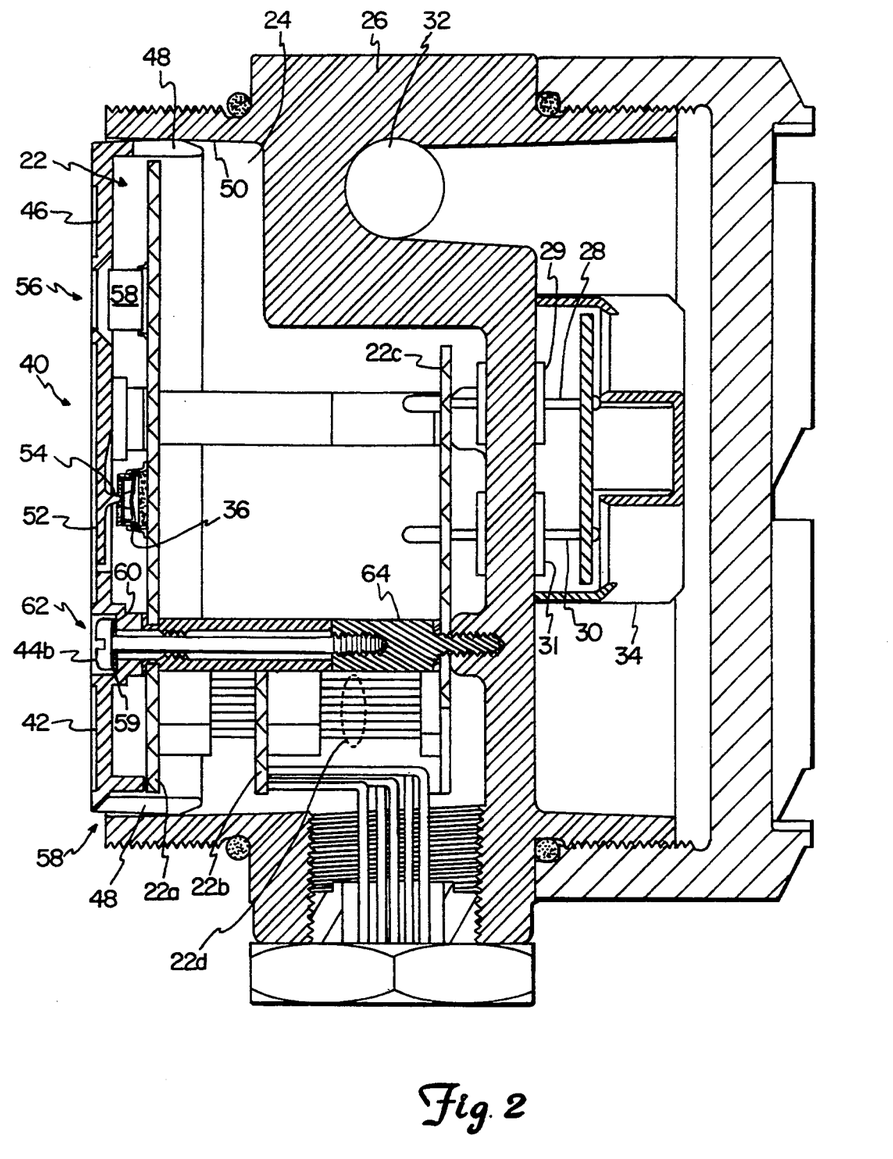
FIG. 2 is an enlarged sectional view of the transmitter head portion from FIG. 1.

FIG. 2 shows head unit 12 enlarged. Circuit assembly 22 comprises circuit boards 22a, 22b, 22c electrically connected by pins 22d which are fixed to board 22c and slideably received by boards 22a and 22b. Feedthrough conductors 28,30 are preferably surrounded by radio frequency suppression devices, such as combined ferrite/capacitive sleeving 29,31 respectively to attenuate EMI-induced noise which may be present on the wire pair mentioned previously which connects to the external control unit. Deflectable button portion 52 includes a nipple 54 which presses against a membrane mechanism within actuatable switch 36 when an operator presses button portion 52.

In the preferred embodiment inner cover 42 is composed of an electrically insulating plastic (e.g., "UL-TEM" 1010 polyetherimide resin, believed to be a trademark of General Electric Company, Syracuse, N.Y.) to which an electrically conductive coating is applied. Preferably, inner surfaces of inner cover 42 (those which face circuit board 22a, including nipple 54 and inwardly-facing surfaces of sleeve 48) are left uncoated so that electrical insulators rather than conductors face circuit components on circuit board 22a, thereby reducing chances of sparking or short circuiting of circuit components to inner cover 42. Further, outer surfaces of inner cover 42 (those facing away from circuit board 22a, including outwardly-facing surfaces of sleeve 48) include a substantially continuous electrically conductive coating to achieve the EMI shielding function. Preferably the coating is metallic and has a sheet resistivity of 2 ohm per square or less. Such coating is satisfactorily fabricated by process No. E/M-6314, available from E/M Corporation, West Lafayette, Ind., applied to a thickness of between 0.050 millimeters and 0.075 millimeters.

The terms insulator and electrically insulating are used herein to refer to materials having a sheet resistivity greater than about 1 Megohm per square, and preferably greater than about 10 Megohms per square. The terms conductor and electrically conductive are used herein to refer to materials having a sheet resistivity less than about 10 ohms per square, and preferably less than about 2 ohms per square. The term EMI is used herein to refer to interference from electromagnetic radiation containing energy at a frequency between 0 Hz (DC) and approximately 10 GHz.

Still referring to FIG. 2, inner cover 42 also has an aperture 56 therein to allow access to miniature sliding switch assembly 58 of circuit assembly 22. Aperture 56 is sized as small as possible, preferably having a maximum linear extent of about 10 millimeters or less, to limit the amount of EMI which can leak through aperture 56. Inner cover 42 also has a notch 58 at one end thereof to permit removal of inner cover 42 from housing 26 by insertion of a tool such as a screwdriver into notch 58 and leveraging the tool against housing 26 to pry inner cover 42 off of housing 26, when screws 44a, 44b, 44c are disengaged. Except at notch 58, inner cover 42 makes galvanic contact with conductive walls 50 along substantially the entire perimeter of sleeve 48. Such arrangement greatly enhances the effectiveness of inner cover 42 to shield circuit assembly 22 from EMI. Additional galvanic contact of inner cover 42 to conductive walls 50 can be made through screws 44a, 44b, 44c. Using screw 44b of FIG. 2 as a representative of all three screws, the screw head contacts a thin metallic washer 59 which in turn contacts shoulder 60 of hole 62 in plate 46. The electrically conductive coating on the outward-facing surfaces of inner cover 42, referred to earlier, extends continuously to shoulder 60 of hole 62. The threaded end of screw 44b contacts metallic standoff 64 which in turn contacts metallic housing 26 and hence also conductive walls 50. Instead of sleeve 48 making galvanic contact with conductive walls 50, sleeve 48 can alternately capacitively couple to conductive walls 50 with a capacitance of 3000 picofarads or more, yielding a low impedance coupling for frequencies above ~1 MHz. In such case inner cover 42 in combination with conductive walls 50 operate as a Faraday cage for EMI having frequencies above 1 MHz.

A front view of transmitter 10, with outer cover 38 removed, is shown in FIG. 3. Shading on inner cover 42 identifies surfaces which have the electrically conductive coating mentioned previously. Plate 46 has a second deflectable button portion 66 similar to deflectable button portion 52. As shown in FIG. 3, the front-facing surfaces of deflectable button portions 52, 66 have the electrically conductive coating applied thereto to enhance EMI shielding. Narrow slots 53, 67, preferably less than about 2 millimeters in width, are included in plate 46 and partially surround deflectable button portions 52, 66, respectively, to enhance flexibility of button portions 52, 66.

Figure 4:
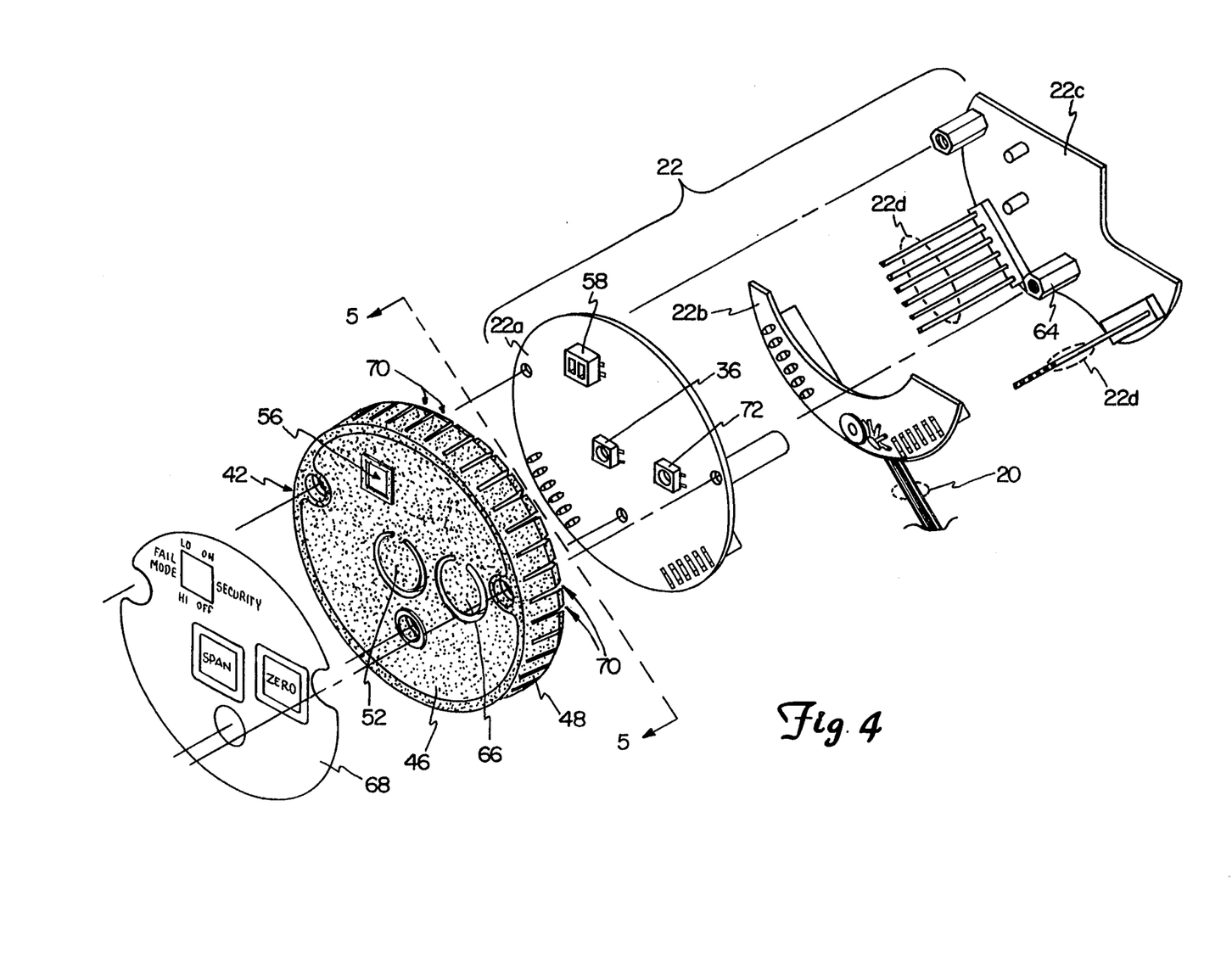
FIG. 4 is an exploded view of an inner cover and electronics assembly in accordance with the invention.

Turning to FIG. 4, circuit assembly 22, inner cover 42, and a flexible overlay mask 68 are shown in an exploded view. Flexible overlay mask 68 has indicia alignable with deflectable button portions 52, 66, and adhesively attaches to inner cover 42. Deflectable button portions 52 and 66 preferably program a "zero" and "span" setting, respectively, of circuit assembly 22. As in FIG. 3, shaded portions of inner cover 42 represent surfaces having the electrically conductive coating. Sleeve 48 has a plurality of slots 70 formed therein to enhance elasticity of sleeve 48. Enhanced elasticity advantageously permits sleeve 48 to flex, enabling inner cover 42 to mate with multiple transmitter housings 26 which have slightly different cavity sizes. Also, enhanced elasticity permits sleeve 48 to operate as a strain relief in response to relative expansion or contraction of conductive walls 50 due to differing ambient temperatures and differing thermal expansion coefficients of the inner cover 42 and housing 26. Circuit board 22a includes actuatable switch 36 alignable with the deflectable button portion 52 and a second actuatable switch 72 alignable with second deflectable button portion 66. Circuit boards 22a, 22b, 22c include other circuit components (not shown) to carry out the stated functions of circuit assembly 22.

Figure 5:
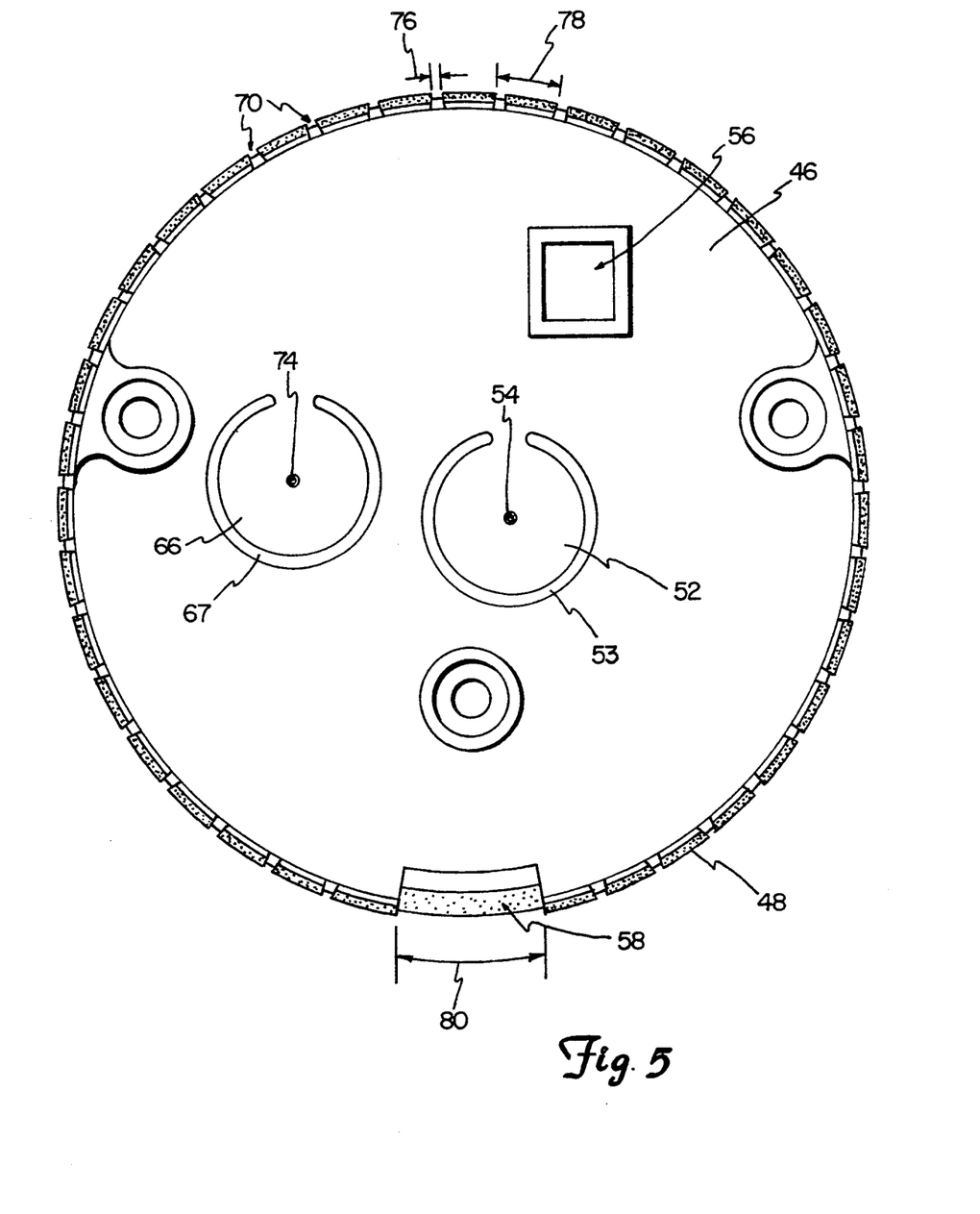
FIG. 5 is a rear view of an inner cover in accordance with the invention.

FIG. 5 shows a rear view of inner cover 42 taken along line 5—5 of FIG. 4. As with FIGS. 3 and 4, shaded portions indicate surfaces treated with the electrically conductive coating. Second deflectable button portion 66 has a nipple 74 similar in construction to nipple 54 and alignable with second deflectable switch 72. Preferably, slots 70 are equally spaced around the perimeter of sleeve 48. Slots 70 preferably have an outer width 76 of approximately 5% to 25% of slot spacing 78. Notch 58 has a width 80 which spans approximately 5% or less of the perimeter of sleeve 48.

Figure 6:
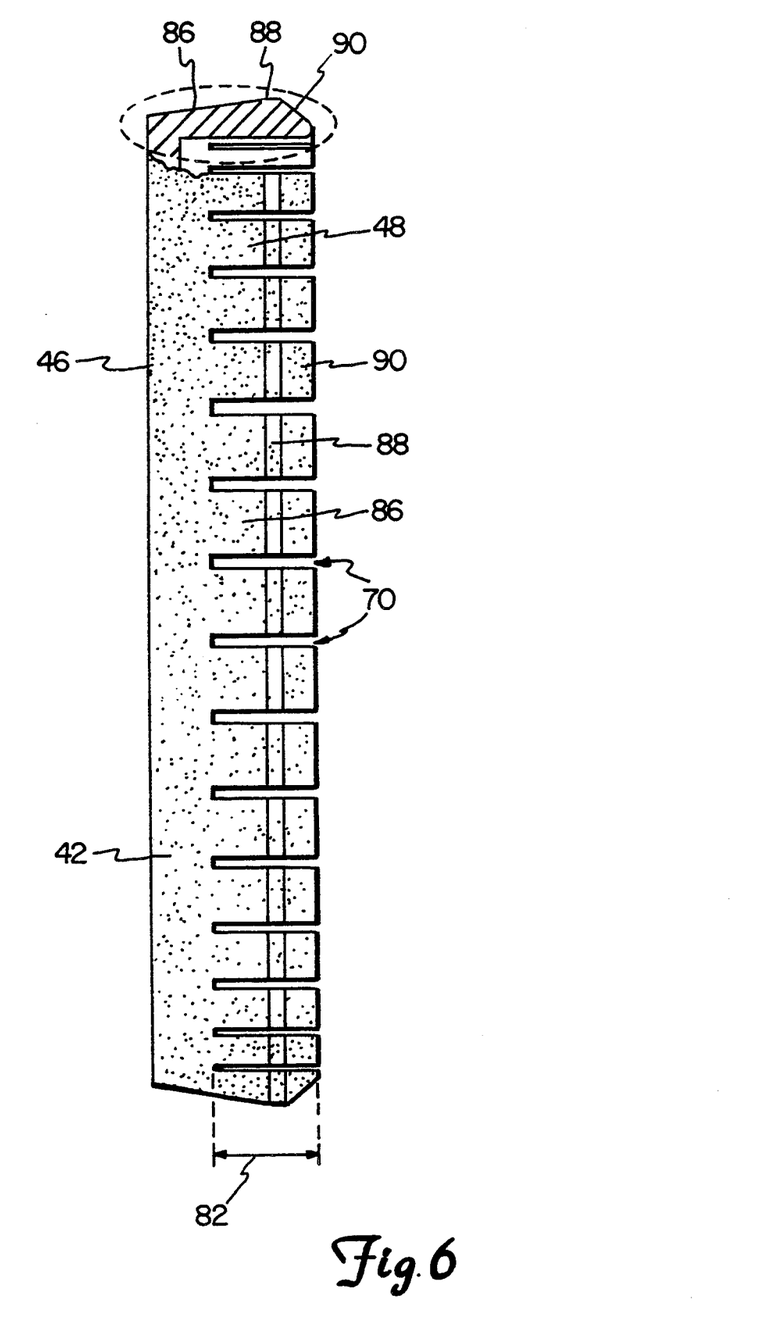
FIG. 6 is a partially sectional side view of an inner cover in accordance with the invention.

FIG. 6 shows a partially sectional view of inner cover 42, again depicting shaded areas as electrically conductive surfaces. For an optimum balance of strength and elasticity, slots 70 preferably have a depth 82 greater than 3 times the sleeve minimum thickness 84 (see FIG. 7) and less than 15 times thickness 84. For a tight friction fit against conductive walls 50, and for interchangeability with cavities 24 of slightly differing sizes, sleeve 48 wedges outward slightly from plate 46 at sleeve region 86. To increase galvanically contacting surface area between sleeve 48 and conductive walls 50, thereby yielding a contact with lower galvanic resistance and less susceptibility to abrasion, sleeve 48 has a flattened region 88 generally perpendicular to plate 46. Region 88 is the portion of sleeve 48 which frictionally contacts conductive walls 50. Sleeve 48 also has a sleeve region 90 wedged inwardly as a guide when initially fitting inner cover 42 into open end 40 of housing 26.

Figure 7:
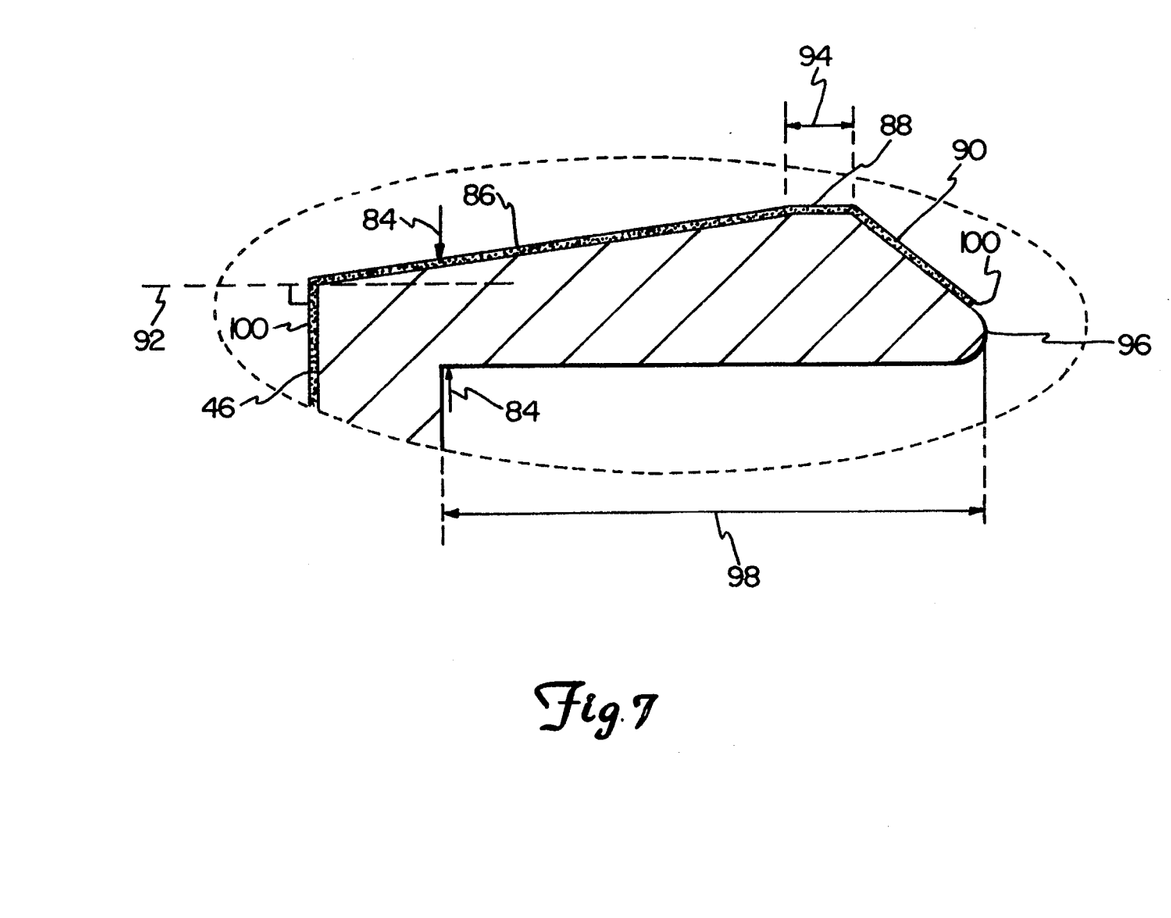
FIG. 7 is an enlarged view of the sectional portion of FIG. 6.

FIG. 7 shows an enlarged view of the sectional portion of inner cover 42 shown in FIG. 6. Dashed line 92 is a reference line perpendicular to plate 46. Preferably, sleeve region 86 makes an angle of 2.7 to 3.5 degrees with line 92. Flat region 88 is preferably disposed generally parallel to line 92 and proximate sleeve end 96. In a preferred embodiment, flat region 88 has a depth 94 of between 2% and 10% of sleeve length 98. Region 90 preferably makes an angle of about 20 to 70 degrees with line 92. The electrically conductive coating referred to earlier is depicted as item 100 in FIG. 7.

Although the present invention has been described with reference to preferred embodiments, workers skilled in the art will recognize that changes can be made in form and detail without departing from the spirit and scope of the invention. For example, inner cover 42 can be made of metal or conductive plastic material as an alternate embodiment. Electrically conductive coating 100 can comprise nickel, copper, silver, aluminum, zinc, carbon fiber, stainless steel fiber, or the like, or other conductive materials such as graphite. Circuit assembly 22 can be energized by a battery disposed in cavity 24, or alternately by ultraviolet, visible, or infrared light coupled to transmitter 10 from a remote light source.

What is claimed is:

1. A transmitter having an actuatable switch, comprising:
   a housing having electrically conductive walls surrounding a cavity, which cavity has an open end;
   an electronics assembly adapted to fit within the cavity, the electronics assembly further including the actuatable switch;
   an inner cover positionable over the open end to cover the electronics assembly, the inner cover including a plate and a sleeve projecting therefrom, the plate including a deflectable button portion alignable with the actuatable switch and accessable from the open end while the electronics assembly is energized; and
   an outer cover adapted to removeably screw onto the housing over the inner cover;
   wherein the inner cover is electrically conductive, and wherein the sleeve is sized to frictionally mate with the electrically conductive walls of the housing to shield the electronics assembly from electromagnetic interference.

2. The transmitter as recited in claim 1, further comprising:
   an energizing terminal communicating with the cavity;
   wherein the electronics assembly makes electrical contact with the energizing terminal when the electronics assembly is disposed in the cavity.

3. The transmitter as recited in claim 1, wherein the inner cover is composed of an insulating plastic with a metallic coating.

4. The transmitter as recited in claim 3, wherein the metallic coating resides on outwardly-facing surfaces of the plate and sleeve.

5. The transmitter as recited in claim 1, wherein the sleeve has a plurality of slots therein to enhance elasticity of the sleeve.

6. The transmitter as recited in claim 1, wherein the electrically conductive walls are interior to the housing, and wherein the inner cover has a notch formed at an edge of the plate to permit removal of the inner cover from the housing by insertion of a tool in the notch.

7. The transmitter as recited in claim 1, wherein the plate has a slot therethrough which at least partially surrounds the deflectable button portion.

8. The transmitter as recited in claim 1, wherein the sleeve wedges outwardly from the plate, and wherein the sleeve includes a flattened portion generally perpendicular to the plate.

9. A transmitter, comprising:
   an electronic module;
   a metallic housing including a housing body and a housing cover, the housing body being adapted to hold the electronic module and having an opening through which the electronic module can be accessed, the housing cover fitting over the opening in a removeable fashion and providing electromagnetic shielding to the electronic module;
   an actuatable switch for modifying a circuit parameter of the electronic module and positioned on the electronic module such that the housing cover must be removed to activate the switch, thereby exposing the electronic module to electromagnetic interference; and
   an inner cover positionable over the opening and having a plate and a sleeve surrounding the plate, the sleeve being sized to frictionally mate with the housing body, the plate including a deflectable button portion alignable with the actuatable switch thereby to permit actuation of the actuatable switch;
   wherein the inner cover is electrically conductive and makes galvanic contact with the housing body along the sleeve, thereby to shield the electronics module from electromagnetic interference when the housing cover is removed.

* * * * *